US008208444B2

(12) United States Patent
Zou et al.

(10) Patent No.: US 8,208,444 B2
(45) Date of Patent: Jun. 26, 2012

(54) METHOD, COMMUNICATION SYSTEM, AND NETWORK ENTITY FOR GROUP NODES HANDOVER

(75) Inventors: Guohui Zou, Shenzhen (CN); Yan Peng, Shenzhen (CN); Zheng Shang, Shenzhen (CN); Bin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 12/507,848

(22) Filed: Jul. 23, 2009

(65) Prior Publication Data
US 2009/0285182 A1 Nov. 19, 2009

Related U.S. Application Data

(63) Continuation of application No. PCT/CN2008/070415, filed on Mar. 5, 2008.

(30) Foreign Application Priority Data

Mar. 5, 2007 (CN) .......................... 2007 1 0135612

(51) Int. Cl.
H04W 4/00 (2009.01)
H04W 36/00 (2009.01)
H04W 72/00 (2009.01)
(52) U.S. Cl. ......... 370/331; 370/338; 455/436; 455/450
(58) Field of Classification Search ............... 370/310.2, 370/331, 349
See application file for complete search history.

(56) References Cited

U.S. PATENT DOCUMENTS 7,957,287 B2 * 6/2011 Venkatachalam ............. 370/232
2004/0058678 A1 * 3/2004 deTorbal ....................... 455/437
2005/0124348 A1 * 6/2005 Gaal et al. ..................... 455/450
2006/0172738 A1 * 8/2006 Kwon et al. .................. 455/439
2007/0249347 A1 * 10/2007 Saifullah et al. .............. 455/436

FOREIGN PATENT DOCUMENTS

JP 2006-311253 11/2006

OTHER PUBLICATIONS

International Search Report from P.R. China in International Application No. PCT/CN2008/070415 mailed Jun. 12, 2008.
Comstock, et al., "MRS Handover in Tunneling Case", IEEE 802.16 Broadband Wireless Access Working Group http://ieee802.org/16, pp. 0-3, (May 8, 2007).
Sydir, et al., "Proposal on addresses, identifiers and types of connections for 802.16j", IEEE 802.16 Broadband Wireless Access Working Group http://ieee802.org/16, pp. 0-8, (Nov. 16, 2006).
Written Opinion of the International Searching Authority (translation) dated (mailed) Jun. 12, 2008, issued in related Application No. PCT/CN2008/070415, filed Mar. 8, 2008, Huawei Technologies Co., Ltd.

* cited by examiner

Primary Examiner — Brandon Renner
(74) Attorney, Agent, or Firm — Finnegan, Henderson, Farabow, Garrett & Dunner LLP

(57) ABSTRACT

A method, a communication system, and a network entity for group handover are provided. The method includes the following steps. A first tunnel connection is established between a mobile relay station (MRS) and a serving entity (SE). A target entity (TE) obtains group information about the group to be handed over, and the group information includes information about a first tunnel. According to the group information, the TE configures information about a second tunnel for the group, and the information about the second tunnel is required for group handover. The group nodes are handed over from the SE to the TE according to the information about the second tunnel. Thereby, the group information that needs to be transmitted in a handover process is reduced, and problems resulting from the number of handovers can be avoided.

4 Claims, 3 Drawing Sheets

1

METHOD, COMMUNICATION SYSTEM, AND NETWORK ENTITY FOR GROUP NODES HANDOVER

CROSS-REFERENCE TO RELATED APPLICATIONS

This application is a continuation of International Application No. PCT/CN2008/070415, filed on Mar. 5, 2008, titled "Method, Communication System, and Network Entity for Group Nodes Handover," which claims priority to Chinese Patent Application No. 200710135612.1, filed with the Chinese Patent Office on Mar. 5, 2007, the entire contents of which are hereby incorporated by reference.

TECHNICAL FIELD

The present disclosure relates to the field of mobile communications, in particular, to a method, a communication system, and a network entity for group handover.

BACKGROUND

A group of nodes is defined as a plurality of mobile nodes (MN) following the same move rules. Moving a group of nodes is referred to as a group move. Examples of some group moves include a tour group, passengers on a vehicle, and other small groups. Moving across a base station (BS) during the process of a group move is referred to as group handover.

One way to handle a group handover is through Layer 2 (L2). This method uses a radio unit (RU) for facilitating the handover of a group. The RU neither controls nor involves the communication between the group and the BS. It is merely configured to notify other equipment in the network (e.g. the BS) in advance that a handover is to be performed, so that the network is able to make preparations for the group move. Upon receiving the notification, the network accomplishes the handover after making some corresponding preparations.

In this solution, as the RU is not in communication with a mobile node, the information about the handover comes from the network or a Global Positioning System (GPS).

In IEEE 802.16j, an application scenario of a relay station (RS) is a mobile relay station (MRS), in which the RS moves together with a large number of Mobile Stations (MS), and assists the MSs to perform a handover.

Another technical solution defined in IEEE 802.16j is to bind new and old connection identifiers (CIDs) on the MRS to keep the old CID unchanged, so that the MS need not be aware of the handover. FIG. 1 is a schematic flow chart of implementing a handover by binding new and old CIDs on an MRS. Referring to FIG. 1, the handover process includes the following steps.

In step 101, the MRS sends a MOB_MSHO-REQ message to a serving base station (SBS) by using its own CID, so as to initiate a handover.

In step 102, the SBS sends a MOB_BSHO-RSP message to the MRS. Before sending the MOB_BSHO-RSP message, the SBS may send CIDs and media access control (MAC) addresses of all the MSs under the control of the MRS to a target base station (TBS) through a backbone network. The SBS receives an HO_ID returned by the TBS and carries the HO_ID in the MOB_BSHO-RSP message.

In step 103, the MRS sends a MOB_HO-IND message to the SBS.

In step 104, the MRS starts to hand over to a new link, and after a synchronization process, the MRS sends an RNG-REQ message for protecting the HO_ID to the TBS.

In step 105, the TBS assigns CIDs to MS1 and MS2 under the control of the MRS, and sends the CIDs to the MRS in an RNG-RSP message. The MRS establishes a matching relation between the new and old CIDs, and exchanges the new and old CIDs during uplink and downlink data transmission.

According to this solution, the RNG-RSP message delivered by the TBS needs to carry the new and old CIDs of all the MSs under the control of the MRS, so that this message may be over-sized.

In another technical solution, all the MSs under the control of the MRS first temporarily hand over to the TBS, then the MRS hands over to the TBS, and finally the MS hands over back to the MRS. According to this solution, problems resulting from an excessive number of handovers can be avoided.

SUMMARY

Various embodiments of the present disclosure provide a method, a communication system, and a network entity for handover of group nodes, so as to reduce the amount of group information that needs to be transmitted in a handover process and problems resulting from an excessive number of handovers can be avoided.

According to an embodiment of the present disclosure, a method for group handover includes the following steps.

A first tunnel connection is established between a mobile relay station (MRS) and a serving entity (SE).

A target entity (TE) obtains group information about the group of nodes desired to be handed over, and the group information includes information about a first tunnel.

According to the group information, the TE configures information about a second tunnel for the group of nodes, and the information about the second tunnel is required for group nodes handover.

The group of nodes are is handed over from the SE to the TE according to the information about the second tunnel.

According to an embodiment of the present disclosure, a communication system includes an SE, a TE, and an MRS.

A first tunnel connection is established between the MRS and the SE.

When the MRS needs to hand over from the SE to the TE, the TE obtains group information about the group of nodes for handover, and the group information includes information about a first tunnel. According to the group information, the TE configures information about a second tunnel for the group of nodes, and the information about the second tunnel is required for group handover. The group of nodes is handed over from the SE to the TE according to the information about the second tunnel.

According to an embodiment of the present disclosure, a network entity includes: a first module, a second module, and a third module.

The first module is configured to obtain group information about a group of nodes needed to be handed over when an MRS needs to be handed over to a service area of the network entity, and the group information includes information about a first tunnel.

The second module is configured to configure information about a second tunnel for the group of nodes, and the information about the second tunnel is required for group handover.

The third module is configured to hand over the group of nodes from an SE to a TE according to the information about the second tunnel.

The embodiments of the present disclosure may reduce the group information that needs to be transmitted in a handover process and problems resulting from the number of handovers can be avoided.

DETAILED DESCRIPTION OF THE EMBODIMENTS

Embodiments of the present disclosure are illustrated below with the accompanying drawings.

In an embodiment of the present disclosure, mobile nodes (MNs) are classified into one group, and a tunnel between the group and a serving entity is established according to certain rules. In a handover process, a group handover can be completed by merely re-establishing a new tunnel. Therefore, the original process of re-establishing a new connection for each mobile node is simplified into one or several tunnel establishing processes, thus avoiding problems resulting from an excessive number of handovers of the MNs in the group. In the implementation, the tunnel may be established by a mobile relay station (MRS) that serves the MNs.

Figure 1:
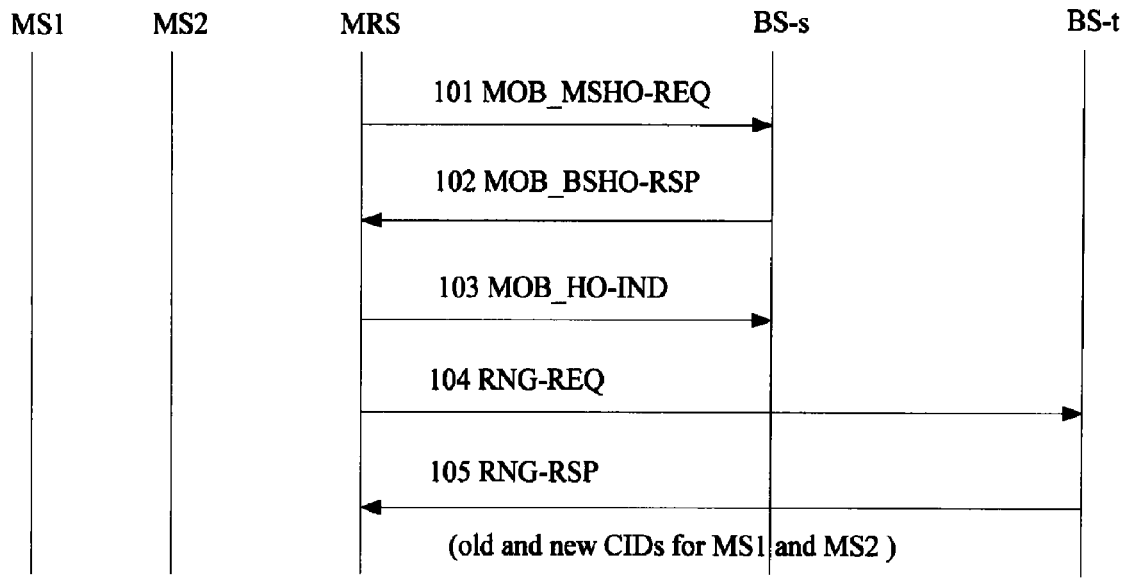
FIG. 1 is a schematic flow chart of implementing a handover by binding new and old CIDs on an MRS.
Figure 2:
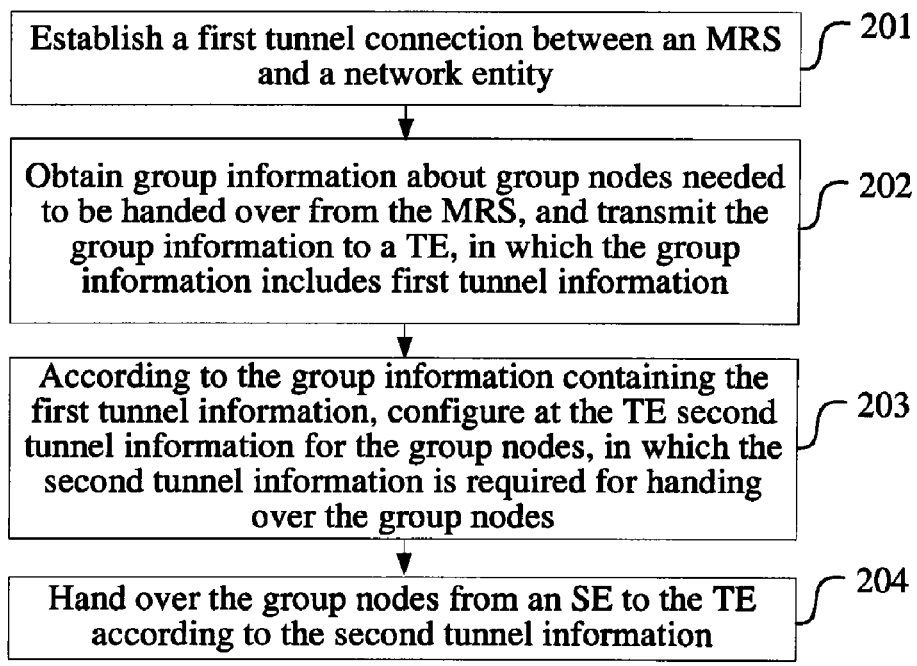
FIG. 2 is a schematic flow chart a method for a group handover according to an embodiment of the present disclosure.

In an embodiment of the present disclosure, a method for group handover is provided. FIG. 2 is a schematic flow chart of the method for group handover, which includes the following steps.

In step 201, a first tunnel connection is established between an MRS and an SE.

In step 202, group information about the group of nodes desired to be handed over is obtained from the MRS and transmitted to a target entity (TE). The group information includes first tunnel information.

In step 203, according to the group information containing the first tunnel information, second tunnel information is configured at the TE for the group of nodes, and the second tunnel information is required for group handover.

In step 204, the group of nodes is handed over from the SE to the TE according to the information the second tunnel information.

When the SE is a serving base station (SBS), the first tunnel information is about a tunnel on a relay link between the MRS and the SBS. The group information further includes session connection identifiers of access links of the nodes in the group. The TE is a target BS (TBS), and according to the group information, second tunnel information about a second tunnel established between the MRS and the TBS is configured at the TBS for the group of nodes, in which the information about the second tunnel is required for group handover.

When the SE is a serving access service network-gateway (ASN-GW), the information about the first tunnel is about a tunnel established between the MRS and the serving ASN-GW, the TE is a target ASN-GW, and according to the group information, second tunnel information about a second tunnel established between the MRS and the target ASN-GW is configured at the target ASN-GW for the group of nodes.

When the SE is a home agent (HA), the information about the first tunnel is information about a tunnel established between the MRS and the HA, the TE is a target HA, and according to the group information, second tunnel information about a second tunnel established between the MRS and the HA is configured at the HA for the group of nodes.

The first tunnel connection between the MRS and the ASN-GW is obtained by negotiating with the ASN-GW after the MRS establishes an Internet Protocol (IP) layer connection, or obtained by negotiating with the BS when the MRS accesses the network.

The MRS that establishes a tunnel connection with the HA supports a network mobility (NEMO) protocol.

Another embodiment may further include the following steps.

The MRS detects a signal sent by the TE, and obtains a TE identifier. When the MRS determines to hand over the group of nodes to the TE, the TE obtains the group information about the group of nodes, and sends the group information to the TE.

Alternatively, the MRS enters the TE without making any handover preparation, and when the TE requests to deliver context information of the MRS, the MRS obtains the group information about the group nodes desired to be handed over from the SE, and sends the group information to the TE.

In some exemplary embodiments, the tunnel can be established by the MRS.

In exemplary embodiments of the present disclosure, the application scenario in IEEE 802.16j is generally taken as an example for illustrating different situations of the group handover. However, it is understood by those skilled in the art that the group handover is not limited to the application in IEEE 802.16j.

In exemplary embodiments of the present disclosure, a network device (for example, the BS or MRS) classifies MNs with the same move rules into one group based on certain information. When the network detects that a group needs to be entirely handed over, the network device may pre-configure various L2 and L3 related parameters required for the handover on target equipment through a mechanism of the network itself. Once it is determined to start a handover, the target network prepares data paths at the network side, context information about a control plane, resource allocation, and the like. In this manner, after an air interface is established between an MN and the target equipment, an end-to-end communication can be quickly established, thus reducing delay caused by handover. Moreover, as the group handover is realized through one process, problems resulting from an excessive number of handovers can be avoided.

Figure 3:
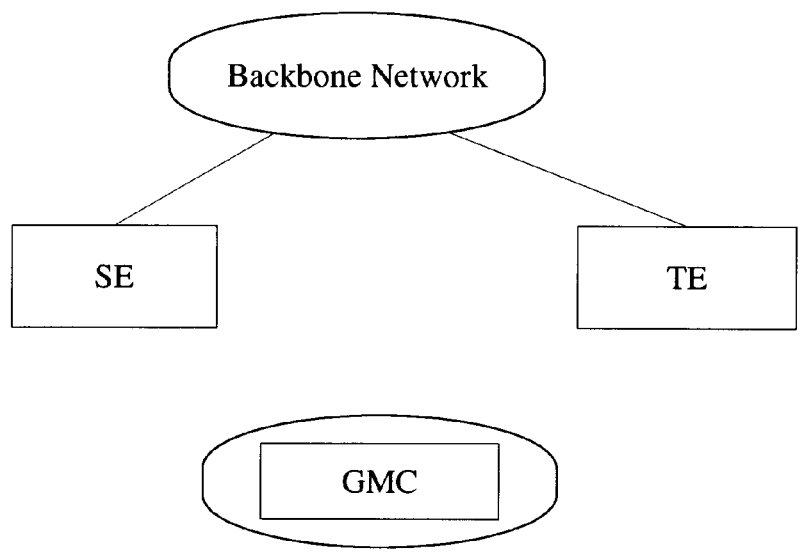
FIG. 3 is a schematic structural view of a communication network system according to an embodiment of the present disclosure.

Due to the same move rules, the network equipment (for example, the BS or MRS) determines whether the nodes belong to one group based on the relative routing information (for example, belonging to the MSs under the control of the same MRS). Afterwards, the network equipment performs maintenance on the group according to the information obtained in the subsequent process, for example, determining whether to add members to the group, whether to delete members, or whether to divide the group into several groups. FIG. 3 is a schematic structural view of a communication network system. Referring to FIG. 3, functional entities involved in group mobility include: an SE, a TE, a backbone network, and a group mobility controller (GMC).

The SE is network equipment currently serving group nodes, and may be a BS or a fixed RS. The TE is a handover target of the group of nodes, and may also be a BS or a fixed RS. In an exemplary the embodiment, the GMC moves together with the group of nodes. The GMC may be located at a certain node in the group of nodes, or at mobile network equipment such as an RS. According to some exemplary embodiments, the GMC is mainly configured to perform group information maintenance, handover trigger, and handover execution. During group handover from the SE to the TE, if the SE and the TE are located in the same subnetwork, it is considered that the wireless link is not changed, and only a handover at L2 occurs; and if the SE and the TE are located in different subnetworks, it is considered that the wireless link of the group nodes is changed, and a handover at L3 occurs accordingly.

According to some exemplary embodiments, the nodes under the control of the GMC may be automatically classified into one group, and a node entering or exiting the GMC is directly added or deleted from the group.

A handover is usually triggered by the GMC. When detecting TE information, the GMC reports the information to the SE, and the SE informs the TE about the group information through the network, so that the TE prepares data paths at the network side, context information about a control plane, resource allocation, and the like. When detecting the mobility of the GMC first, the TE obtains information about the SE that serves the GMC through an upper layer entity or by other means, for example, inquiring peripheral network equipment for information about the GMC, obtaining information about the SE that serves the GMC, and requesting the SE for the group information.

During the implementation of the handover, generally, as long as the GMC accomplishes the handover, the MS may perform normal communication with a new TE.

In the following embodiments, it is considered that a GMC is an RS, an SE is an SBS, a TE is a TBS, a tunnel identifier is a tunnel connection identifier (T-CID), a session connection identifier is a CID, an access link is a link between an RS and an MS, and a relay link is a link between an RS and a BS. During the implementation, in accordance with varied data transmission modes, messages carried in the handover process are also different, which will be illustrated in the following embodiments.

Embodiment 1

In this embodiment, the RS and the SBS are connected through a tunnel. The SBS distinguishes users through the tunnel identifier and the session connection identifier of the MS. On the access link, data is transmitted and received via a normal MAC format based on IEEE 802.16j. Data packets on the relay link may be in a format of a T-CID header followed by a plurality of normal MAC messages based on IEEE 802.16j. An initial tunnel on the relay link may be established when the RS accesses the network. Therefore, the handover can be accomplished by merely re-establishing a tunnel under the TBS.

Figure 4:
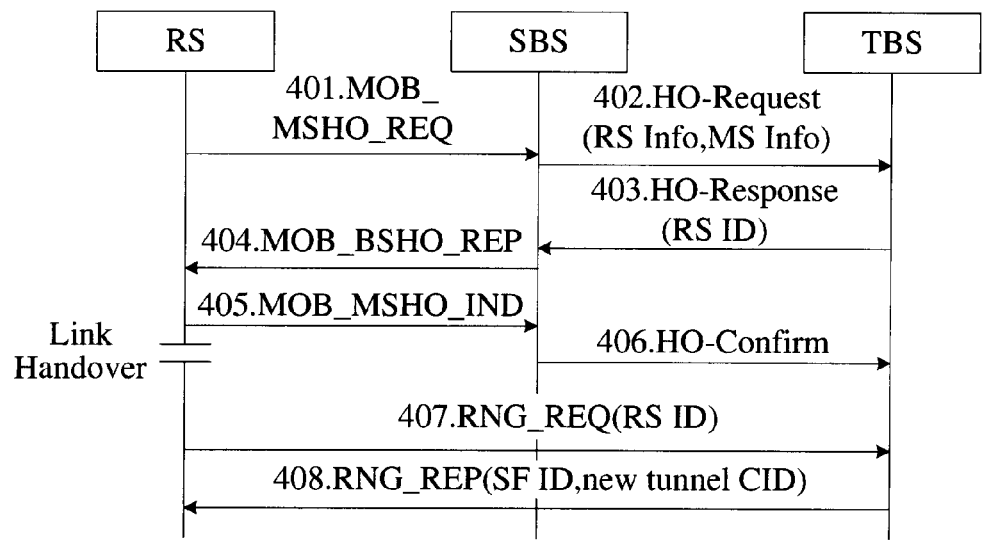
FIG. 4 is a schematic flow chart of implementing a group handover through a tunnel connection on a relay link according to an embodiment of the present disclosure.

FIG. 4 is a schematic flow chart of implementing a group handover through a tunnel connection on a relay link. Referring to FIG. 4, the handover process includes the following steps.

In step 401, after detecting a signal and sensing a broadcast message from the TBS to obtain messages such as a TBS ID, the RS determines to hand over to the TBS, and informs the SBS of the handover.

In step 402, the SBS informs the TBS of the group information to be handed over through an upper layer entity or by means of direct communication. The group information includes an RS ID, capabilities of the RS, tunnel information on the relay link, and the like.

In step 403, the TBS establishes a data path for the RS and the MS under the RS (for example, assigning appropriate physical layer parameters to the RS, re-generating a CID for the corresponding tunnel, and performing SF update), reserves wireless resources, establishes context about a control plane (for example, obtaining or generating a new key), and informs the SBS that the TBS can be accessed by the RS.

In step 404, the SBS delivers information allowing the RS to access the TBS.

In step 405, the RS informs the SBS of the handover target TBS determined by itself in a message.

In step 406, the SBS sends a handover determination message to the TBS, so as to inform the TBS that a handover is to be performed. The TBS starts waiting for the access of the RS.

In step 407, after disconnecting from the SBS, the RS sends a RNG_REQ message, indicating its own identity using the RS ID, after completing downlink synchronization process of the TBS.

In step 408, the TBS delivers parameters pre-configured for the RS and new tunnel information (an SF ID of the original tunnel and a CID of the corresponding new tunnel) to the RS.

Consistent with at least this embodiment, various CIDs of the MSs may remain unchanged while only the CID of the tunnel is changed, and the tunnel is established on the RS and the BS at a small number, so that the re-establishment of a tunnel may be accomplished more easily and rapidly and may only require a small change to the existing system and thus may not reduce the security of the system.

Embodiment 2

Consistent with this embodiment, the RS and the GW are connected through a tunnel. The RS plays both roles of the MS and the SBS, i.e. the RS is the SBS for the MS and is the MS for the SBS. Moreover, the MS is completely transparent in this aspect, and the SBS may also be transparent under certain circumstances. In order to achieve this objective, a direct data path is provided between the RS and the GW. The data path between the RS and the ASN-GW is established by negotiating with the ASN-GW after the RS establishes an IP layer connection, or by negotiating with the BS when the RS accesses the network.

When the data path is established by negotiating with the ASN-GW after the RS establishes an IP layer connection, as the tunnel establishment process is irrelevant to the BS, the RS may pack MS data according to a data format between the BS and the GW, and then transmit the data packets to the BS through the relay link. The BS transfers the data packets to the ASN-GW according to the original mechanism with no need to identify the content of the data packets. The ASN-GW can read the content of the data packets by merely unpacking two layers of the tunnel.

When the data path is established by negotiating with the BS when the RS accesses the network, as the establishment process is irrelevant to the ASN-GW, the BS only needs to relay the data packets between the RS and the ASN-GW, and such a relay process only requires to convert a format of a MAC header of the access link into a transmission protocol format between the BS and the ASN-GW without changing the message payload.

One advantage of the solution in this embodiment is the reduction of information that needs to be transmitted during the handover of the group.

Figure 5:
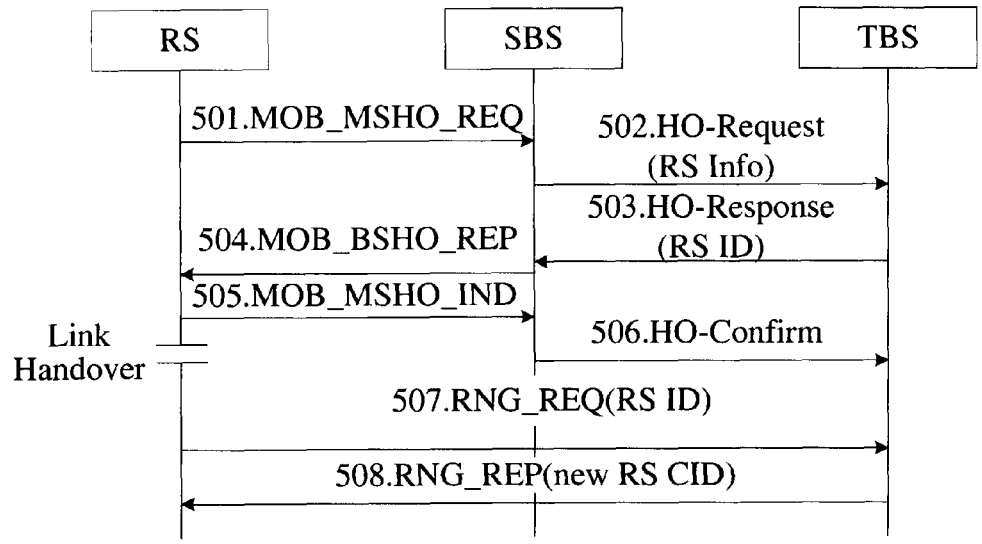
FIG. 5 is a schematic flow chart of implementing a group handover through a tunnel connection between an RS and a GW according to an embodiment of the present disclosure.

FIG. 5 is a schematic flow chart of implementing a group handover through a tunnel connection between the RS and the GW. Referring to FIG. 5, the handover process includes the following steps.

In step 501, after detecting a signal and sensing a broadcast message from the TBS to obtain messages such as a TBS ID, the RS determines to hand over to the TBS, and informs the SBS of the handover.

In step 502, the SBS informs the TBS of the group information to be handed over through an upper layer entity or by means of direct communication. The group information includes an RS ID, capabilities of the RS, and the like.

In step 503, the TBS establishes a data path for the RS and the MS under the RS (for example, assigning appropriate physical layer parameters to the RS, re-generating a CID for the RS, and performing SF update), reserves wireless resources, establishes context about a control plane (for example, obtaining or generating a new key), and informs the SBS that the TBS can be accessed by the RS.

In step 504, the SBS delivers information allowing the RS to access the TBS.

In step 505, the RS informs the SBS of the handover target TBS determined by itself in a message.

In step 506, the SBS sends a handover determination message to the TBS, so as to inform the TBS that a handover is to be performed. The TBS starts waiting for the access of the RS.

In step 507, after disconnecting from the SBS, the RS starts ranging after completing downlink synchronization process of the TBS, indicating its own identity in the RNG_REQ message using the RS ID.

In step 508, the TBS delivers parameters pre-configured for the RS and a new RS CID to the RS.

Embodiment 3

In this embodiment, the RS and the HA are connected through a tunnel, the RS having the functions of a mobile router, i.e., supporting a NEMO protocol, and the MS may regard the RS as an access router. Here, a handover process may be performed according to the steps in Embodiment 2, and the details will not be repeated herein again.

An advantage of embodiments 2 and 3 includes maintaining independent access and relay links such that the relay link and the access link may adopt different wireless access technologies. Embodiment 3 also has this advantage when a handover is performed on the group across different GWs.

Embodiment 4

This embodiment illustrates a reactive handover mode. This embodiment illustrates a handover process in which the RS directly hands over to the TBS before the handover is triggered. This embodiment ensures that the handover process can still be effectively and rapidly performed this occurs. The implementation with the RS and the SBS connected through a tunnel is taken as an example for illustration below. Embodiments 2 and 3 may also be implemented in this manner.

Figure 6:
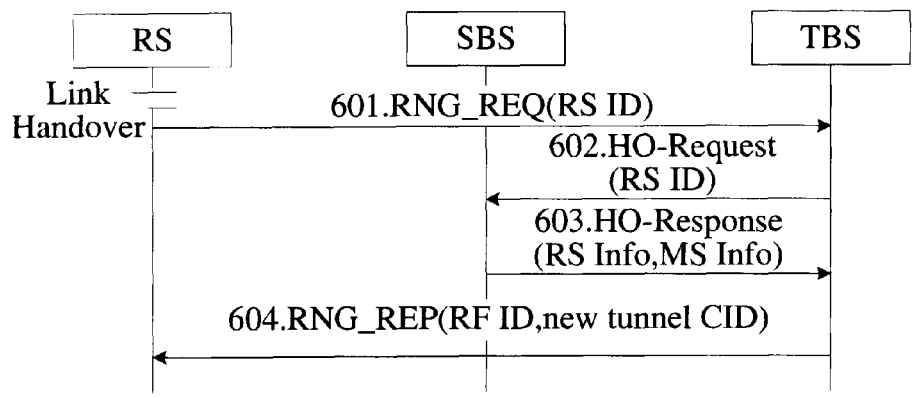
FIG. 6 is a schematic flow chart of implementing a group handover through a tunnel connection on a relay link in a Reactive handover mode according to an embodiment of the present disclosure.

FIG. 6 is a schematic flow chart of implementing a group handover through a tunnel connection on a relay link in a reactive handover mode. Referring to FIG. 6, the handover process includes the following steps.

In step 601, after directly entering the TBS without making any handover preparation, the RS can only initiate a ranging process, i.e. sending an RNG_REQ message to the TBS to request accessing.

In step 602, the TBS sends an RS ID of the RS after the handover to the SBS through an upper layer entity or by means of direct communication, so as to request the SBS for context information about the RS and inform the TBS about the same.

In step 603, after receiving the request, the SBS returns the group information at once (including the RS ID, capabilities of the RS, CIDs on the access links of all the MSs under the RS and corresponding SF IDs thereof, and tunnel information on the relay link).

In step 604, after obtaining the context of the RS, the TBS establishes a data path for the RS and the MS under the RS (for example, assigning appropriate physical layer parameters to the RS, re-generating a corresponding tunnel CID, and performing SF update), reserves wireless resources, and establishes context about a control plane (for example, obtaining or generating a new key). Then, the TBS delivers parameters pre-configured for the RS and new tunnel information (an SF ID of the original tunnel and a CID of the corresponding new tunnel) to the RS.

During the implementation of the present disclosure, the data paths of the group of node are established by constructing a tunnel between the MRS and the network equipment, and the group handover management is accomplished by re-establishing the tunnel.

In the handover process, the group handover is realized via the tunnel on the relay link, and the method of the group handover is performed through the tunnel between the MRS and the GW. The implementation of the present disclosure further provides group handover in a predictive and a reactive mode. The TBS may obtain the information about the group handover in advance, and thus reserves the resources, thereby greatly reducing the failure rate of the handover and accelerating the handover process. As such, the handover of all the MSs can be accomplished in one process, thus avoiding problems resulting from excessive handover signaling which can be caused by the handover of a large number of MSs.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for group handover, comprising:
   establishing a first tunnel connection between a mobile relay station (MRS) and a serving base station (SBS);
   obtaining, by a target base station (TBS), a group information about a group of mobile stations to be handed over, wherein the group information comprises connection identifiers of the mobile stations and a first tunnel information and the first tunnel information comprises a first tunnel connection identifier;
   establishing a second tunnel connection between the MRS and the TBS;
   configuring, by the TBS, a second tunnel information related to the second tunnel connection for the group according to the group information, the second tunnel information comprising a second tunnel connection identifier; and
   handing over the group from the SBS to the TBS according to the second tunnel information without using the connection identifiers of the mobile stations.

2. The method according to claim 1, further comprising:
   detecting, by the MRS, a signal sent by the TBS;
   obtaining, by the MRS, a TBS identifier; and when the MRS determines to hand over the group to the TBS, sending, by the SBS, the group information to the TBS.

3. The method according to claim 1, further comprising:
requesting, by the TBS, a context information when the MRS enters a serving area of the TBS; and
obtaining, by the TBS, the group information from the SBS.

4. A communication system, comprising:
a serving base station (SBS);
a target base station (TBS); and
a mobile relay station (MRS), wherein:
a first tunnel connection is established between the MRS and the SBS;
a second tunnel connection is established between the MRS and the TBS;
the TBS is configured to obtain a group information about a group of mobile stations to be handed over from the SBS to the TBS, and configure a second tunnel information related to the second tunnel connection for the group according to the group information, wherein
the group information comprises connection identifiers of the mobile stations and a first tunnel information,
the first tunnel information comprises a first tunnel connection identifier, and the second tunnel information comprises a second tunnel connection identifier; and
the TBS is further configured to hand over the group from the SBS to the TBS according to the second tunnel information without using the connection identifiers of the mobile stations.

* * * * *